United States Patent
Nonaka et al.

(10) Patent No.: US 7,596,637 B2
(45) Date of Patent: Sep. 29, 2009

(54) STORAGE APPARATUS AND CONTROL METHOD FOR THE SAME, AND COMPUTER PROGRAM PRODUCT

(75) Inventors: Yusuke Nonaka, Sagamihara (JP); Shoji Kodama, Sagamihara (JP); Tetsuya Shirogane, Odawara (JP)

(73) Assignee: Hitachi, Ltd., Tokyo (JP)

( * ) Notice: Subject to any disclaimer, the term of this patent is extended or adjusted under 35 U.S.C. 154(b) by 142 days.

(21) Appl. No.: 11/364,983

(22) Filed: Feb. 28, 2006

(65) Prior Publication Data
US 2007/0168470 A1 Jul. 19, 2007

(30) Foreign Application Priority Data
Dec. 14, 2005 (JP) .............................. 2005-359871

(51) Int. Cl.
G06F 12/08 (2006.01)
(52) U.S. Cl. ............................... 710/15; 710/8; 710/36; 710/62; 711/100
(58) Field of Classification Search ................. 711/114, 711/162, 165, 158, 150, 163, 148; 710/38, 710/316, 8; 709/219, 229; 717/170
See application file for complete search history.

(56) References Cited

U.S. PATENT DOCUMENTS

| | | | | |
|---|---|---|---|---|
| 6,073,218 | A * | 6/2000 | DeKoning et al. | 711/150 |
| 6,343,324 | B1 * | 1/2002 | Hubis et al. | 709/229 |
| 6,393,535 | B1 * | 5/2002 | Burton et al. | 711/158 |
| 6,633,962 | B1 * | 10/2003 | Burton et al. | 711/163 |
| 6,980,510 | B1 * | 12/2005 | Deitz et al. | 370/217 |
| 7,243,198 | B2 * | 7/2007 | Berkowitz et al. | 711/162 |
| 7,272,674 | B1 * | 9/2007 | Nandi et al. | 710/38 |
| 7,301,776 | B1 * | 11/2007 | Wang et al. | 361/737 |
| 2002/0095602 | A1 | 7/2002 | Pherson et al. | |
| 2003/0088658 | A1 | 5/2003 | Davies et al. | |
| 2003/0093509 | A1 | 5/2003 | Li et al. | |
| 2004/0078599 | A1 | 4/2004 | Nahum et al. | |
| 2004/0250021 | A1 * | 12/2004 | Honda et al. | 711/114 |
| 2005/0270930 | A1 * | 12/2005 | Uemura | 369/47.1 |

FOREIGN PATENT DOCUMENTS

JP 2001-265655 9/2001

OTHER PUBLICATIONS

Thompson et al. "Quick storage provisioning for blades," Research Disclosure, Mason Publications, Hampshire, UK, vol. 493, No. 97 (May 2005).

(Continued)

*Primary Examiner*—Henry W. H. Tsai
*Assistant Examiner*—Cheng-Yuan Tseng
(74) *Attorney, Agent, or Firm*—Townsend and Townsend and Crew LLP

(57) ABSTRACT

A storage apparatus is configured to detect a connection from a new host system having no logical unit assigned thereto. The storage apparatus assigns, if any new host system is detected, a new logical unit to that new host system. By so doing, it is possible to generate a logical unit and associate it with a relevant host system whenever a storage apparatus is introduced or a new host system is added, without input from a storage apparatus administrator at a management console. It is thus possible to simplify the storage apparatus settings required whenever a storage apparatus is introduced or a new host system is added.

10 Claims, 12 Drawing Sheets

OTHER PUBLICATIONS

"Storage Virtualization—Definition Why, What, Where, and How?" online article from http://www.snseurope.com (Nov. 1, 2004).

Xiao et al. "Research on Security of Storage Area Network," Proceedings of the Information Security. International Conference (ISC 2004) 3:238-239 (2004).

Yoshida "LUN Security Considerations for Storage Area Networks," Hitachi Data Systems, pp. 1-7, (1999).

European Patent Office (EPO) search report dated Oct. 25, 2007 for EPO patent application EP06253078.

* cited by examiner (A)

| LUN | VIRTUAL CAPACITY | ACTUAL CAPACITY | CPU NUMBER | MAPPING WITH DISK POOL ||||||
|---|---|---|---|---|---|---|---|---|---|
| | | | | LU_LBA1 | POOL LBA1 | LU_LBA2 | POOL LBA2 | ... | LU_LBAn | POOL LBAn |
| 0 | 2000 GB | 300 GB | 1 | 0-299999999 | 0-299999999 | 0-299999999 | 600000000-899999999 | | |
| 1 | 2000 GB | 150 GB | 2 | 0-299999999 | 300000000-599999999 | | | | |

| WWN | HOST I/F NUMBER | HOST LUN | LUN |
|---|---|---|---|
| AAA | 1 | 0 | 0 |
| BBB | 1 | 0 | 1 |

| PRIORITY | WWN | NEW HOST REGISTRATION (ALLOWED/NOT ALLOWED) |
|---|---|---|
| 2 | * | ALLOWED |
| 1 | BBB | NOT ALLOWED |

| LUN | VIRTUAL CAPACITY | ACTUAL CAPACITY | CPU NUMBER | MAPPING WITH DISK POOL | | | | | |
|---|---|---|---|---|---|---|---|---|---|
| | | | | LU_LBA1 | POOL LBA1 | LU_LBA2 | POOL LBA2 | ... | LU_LBAn | POOL LBAn |
| 0 | 2000 GB | 300 GB | 1 | 0-299999999 | 0-299999999 | 3000000000-5999999999 | 6000000000-5999999999 | | |
| 1 | 2000 GB | 150 GB | 2 | 0-299999999 | 3000000000-5999999999 | | | | |
| 2 | 2000 GB | 0 GB | 3 | | | | | | |

142

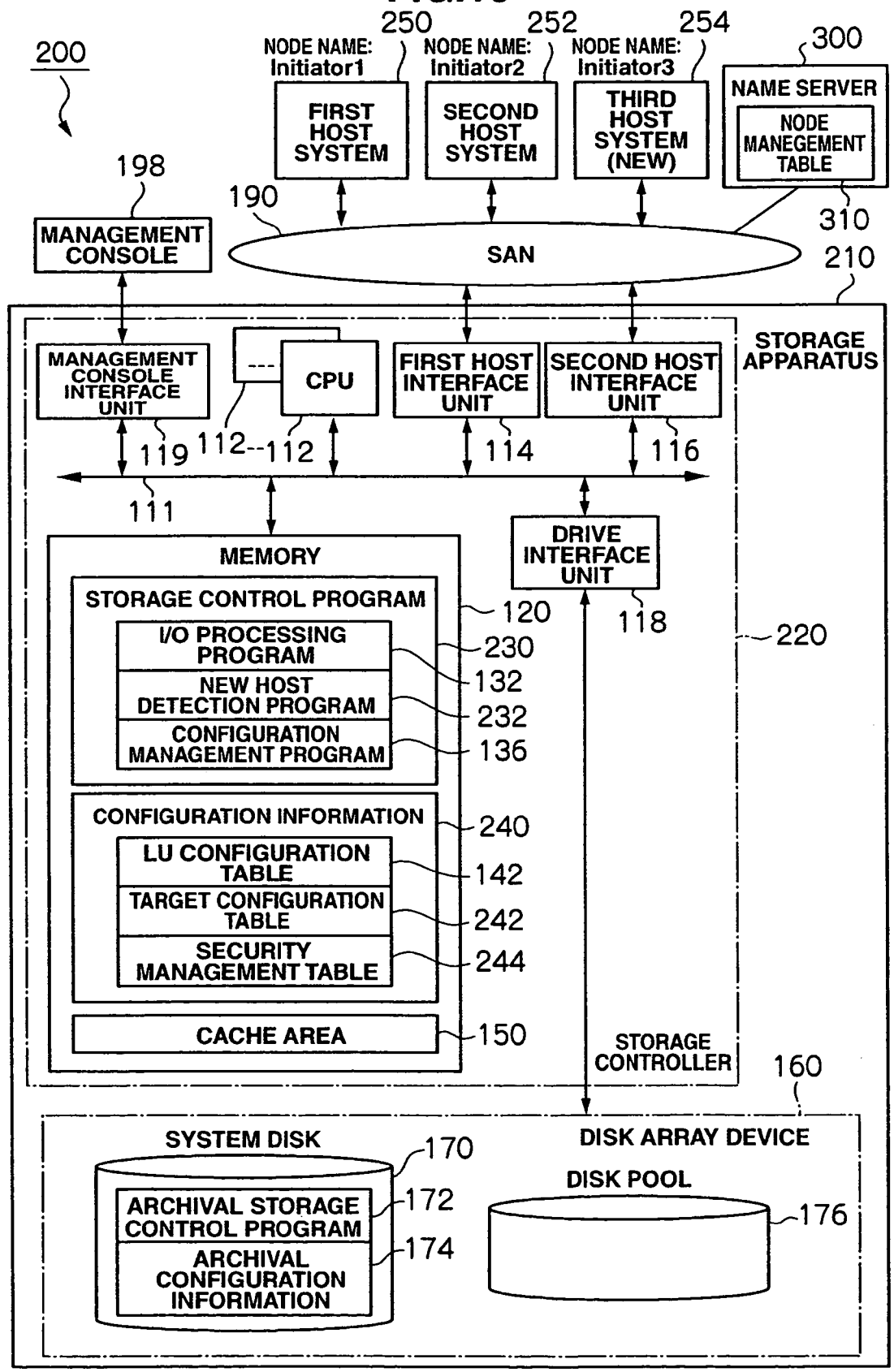

FIG.11

| NODE NAME | NODE TYPE | NODE ADDITION REPORT (REQUIRED/ NOT REQUIRED) | DOMAIN | ADDRESS |
|---|---|---|---|---|
| DefaultTarget | TARGET | REQUIRED | * | 10.0.0.10 |
| Initiator1 | INITIATOR | REQUIRED | DD1 | 10.0.0.1 |
| Target1 | TARGET | NOT REQUIRED | DD1 | 10.0.0.10 |
| Initiator2 | INITIATOR | REQUIRED | DD2 | 10.0.0.2 |
| Target2 | TARGET | NOT REQUIRED | DD2 | 10.0.0.10 |

Columns: 311, 312, 313, 314, 315 — Table 310

FIG.12

| TARGET NAME | HOST I/F NUMBER | HOST NODE NAME | HOST LUN | LUN |
|---|---|---|---|---|
| Target1 | 1 | Initiator1 | 0 | 0 |
| Target2 | 1 | Initiator2 | 0 | 1 |

Columns: 2421, 2422, 2423, 2424, 2425 — Table 242

FIG.14

| TARGET NAME | HOST I/F NUMBER | HOST NODE NAME | HOST LUN | LUN |
|---|---|---|---|---|
| Target1 | 1 | Initiator1 | 0 | 0 |
| Target2 | 1 | Initiator2 | 0 | 1 |
| Target3 | 1 | Initiator3 | 0 | 2 |

| NODE NAME | NODE TYPE | NODE ADDITION REPORT (REQUIRED/ NOT REQUIRED) | DOMAIN | ADDRESS |
|---|---|---|---|---|
| DefaultTarget | TARGET | REQUIRED | * | 10.0.0.10 |
| Initiator1 | INITIATOR | REQUIRED | DD1 | 10.0.0.1 |
| Target1 | TARGET | NOT REQUIRED | DD1 | 10.0.0.10 |
| Initiator2 | INITIATOR | REQUIRED | DD2 | 10.0.0.2 |
| Target2 | TARGET | NOT REQUIRED | DD2 | 10.0.0.10 |
| Initiator3 | INITIATOR | REQUIRED | DD3 | 10.0.0.3 |
| Target3 | TARGET | NOT REQUIRED | DD3 | 10.0.0.10 |

310

STORAGE APPARATUS AND CONTROL METHOD FOR THE SAME, AND COMPUTER PROGRAM PRODUCT

CROSS-REFERENCES TO RELATED APPLICATIONS

This application relates to and claims priority from Japanese Patent Application No. 2005-359871, filed on Dec. 14, 2005, the entire disclosure of which is incorporated herein by reference.

BACKGROUND OF THE INVENTION

The present invention relates to a storage apparatus and a control method for the same, and a computer program product. This invention is suitable for, for example, a storage apparatus providing its storage areas for host systems in logical units (LU).

SAN (Storage Area Network) technology has been widely used for connecting a storage apparatus with a host system. Since this technology enables one storage apparatus to be used jointly by several host systems, it is possible to integrate several storage apparatuses within a site and simplify their management.

Also, in a conventional type of storage apparatus, the physical storage media constituting the storage apparatus, such as hard disks or flash memory, are managed as logically divided storage areas, and so it is possible to generate plural logical units in a storage apparatus.

Moreover, as disclosed in JP-A-2001-265655, a method has been proposed for managing the correlation of a WWN (World Wide Name) that uniquely identifies a SAN host system with a logical unit number (LUN) in a storage system and setting a specific logical unit as being available only for a specific host system. That kind of information about a storage apparatus configuration can be set by a storage apparatus administrator using a management console.

SUMMARY OF THE INVENTION

In the above conventional type of storage apparatus, by using known techniques, it is possible to divide storage areas provided by the storage apparatus into any particular number of logical units, assign the logical units to one or more host systems, and prevent the host system(s) from accessing any logical unit other than those assigned.

However, for assigning a logical unit to a host system and controlling access from a host system to a logical unit as above, a storage apparatus administrator has to go through the very complicated process of generating logical units and associating them with relevant host systems by using a management console whenever a storage apparatus is introduced or a new host system is added.

Accordingly, it is an object of this invention to provide a storage apparatus and a control method for the same, and a computer program product, that can simplify the storage apparatus settings required whenever a storage apparatus is introduced or a new host system is added.

In order to solve the above-described problems, the invention provides a storage apparatus for performing data input/output in response to data input/output requests from a host system, with respect to a logical unit assigned to the host system, the storage apparatus including a host detection unit that detects a connection from a new host system having no logical unit assigned thereto; and a logical unit assigning unit that assigns, if the new host system is detected by the host detection unit, a new logical unit to that new host system.

Accordingly, in the above storage apparatus, it is possible to generate a logical unit and associate it with a relevant host system whenever a storage apparatus is introduced or a new host system is added, without input from a storage apparatus administrator at a management console.

The invention also provides a method for controlling a storage apparatus that performs data input/output in response to data input/output requests from a host system, with respect to a logical unit assigned to the host system, the method including the steps of: detecting a connection from a new host system having no logical unit assigned thereto; and assigning a new logical unit to that new host system when the new host system is detected.

Accordingly, with the above method for controlling a storage apparatus, it is possible to generate a logical unit and associate it with a relevant host system whenever a storage apparatus is introduced or a new host system is added, without input from a storage apparatus administrator at a management console.

The invention further provides a computer program product having a computer-readable recording medium on which is recorded a computer program to be installed in a storage apparatus that performs data input/output in response to data input/output requests from a host system, with respect to a logical unit assigned to the host system, the computer program causing the storage apparatus to execute the steps of: detecting a connection from a new host system having no logical unit assigned thereto; and assigning a new logical unit to that new host system when the new host system is detected.

Accordingly, with the above computer program product, it is possible to generate a logical unit and associate it with a relevant host system whenever a storage apparatus is introduced or a new host system is added, without input from a storage apparatus administrator at a management console.

According to this invention, it is possible to generate a logical unit and associate it with a relevant host system whenever a storage apparatus is introduced or a new host system is added, without input from a storage apparatus administrator at a management console. Thus, a storage apparatus and a control method for the same, and a computer program product, that can simplify the storage apparatus settings required whenever a storage apparatus is introduced or a new host system is added can be achieved.

BRIEF DESCRIPTION OF THE DRAWINGS

FIG. 4 is a schematic view for explaining a host-LU mapping table;

FIG. 5 is a schematic view for explaining a security management table;

FIG. 8 is a schematic view for explaining the LU configuration table after an entry for a new logical unit is added;

FIG. 9 is a schematic view for explaining the host-LU mapping table after an entry for a new logical unit is added;

FIG. 10 is a block diagram of the storage system configuration according to a second embodiment;

FIG. 11 is a schematic view for explaining a node management table;

FIG. 12 is a schematic view for explaining a target configuration table;

FIG. 14 is a schematic view for explaining the target configuration table after an entry is added for a new logical unit and a new target;

FIG. 15 is a schematic view for explaining the node management table after an entry for a new node is added.

DETAILED DESCRIPTION OF THE INVENTION

Embodiments of this invention are described below in detail with reference to the attached drawings.

(1) First Embodiment

Figure 1:
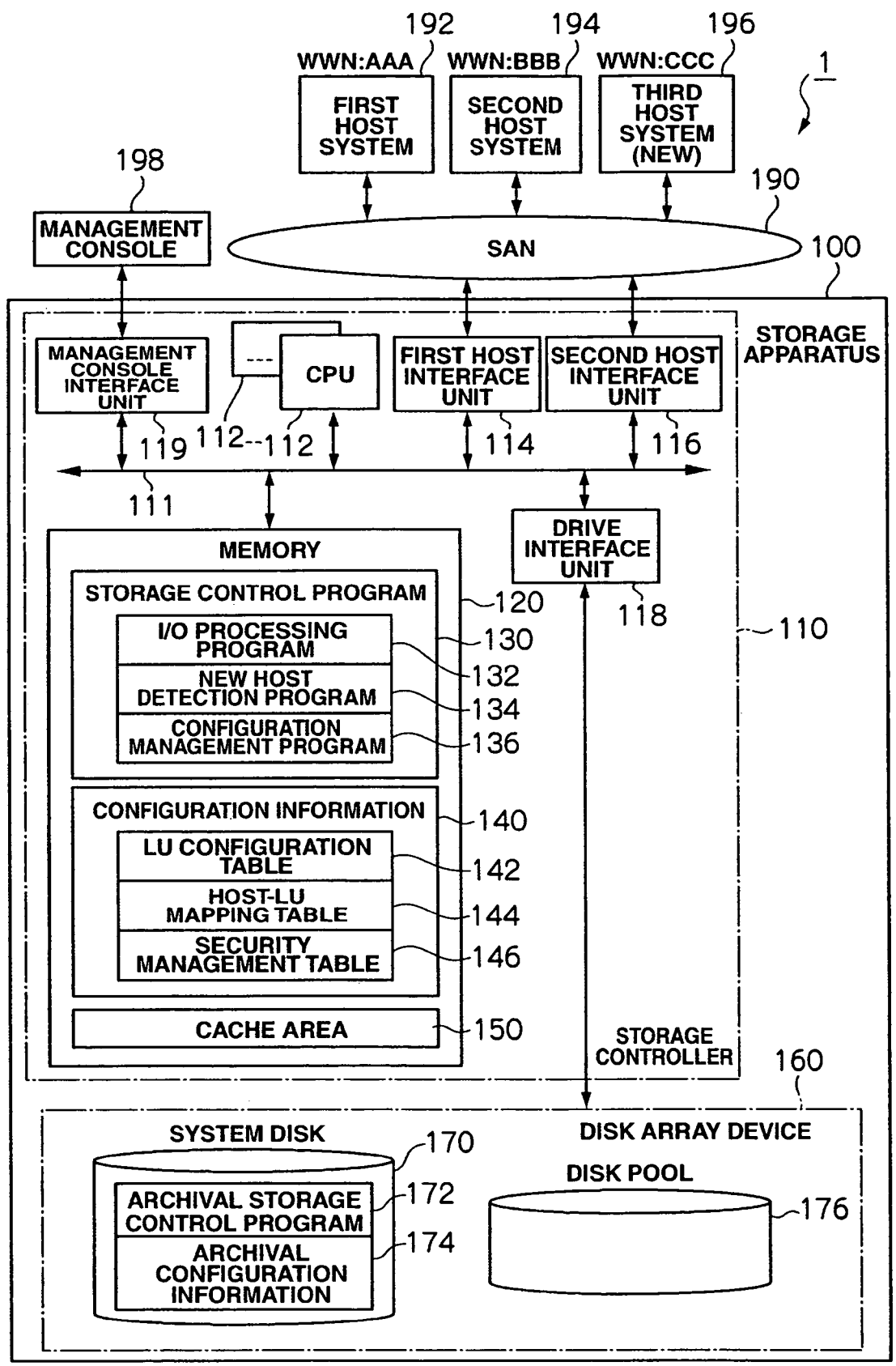
FIG. 1 is a block diagram of the storage system configuration according to a first embodiment of the present invention.

In FIG. 1, reference numeral 1 shows the entire storage system according to this embodiment. The storage system according to this embodiment is configured to include a storage apparatus 100 and first through third host systems 192, 194 and 196, both connected via a SAN 190 structured using Fibre Channel (FC) or other such techniques, so that they can communicate with each other.

The storage apparatus 100 is configured to include a storage controller 110 and a disk array device 160. The storage controller 110 is an interface that connects the disk array device 160 with the SAN 190, and functions to control the disk array device 160 and perform data input/output in response to requests from the first or second host system 192 or 194 (or the third host system 196). The storage controller 110 is configured to include one or more CPUs (Central Processing Units) 112, first and second host interface units 114 and 116, a drive interface unit 118, a management console interface unit 119 and a memory 120, all connected via an internal bus 111 to be able to communicate with each other. In this embodiment, the storage apparatus 100 includes one storage controller 110, but may include any number of storage controllers 110.

The CPU 112 is a microprocessor that controls the storage controller 110. In this embodiment, the storage controller 110 includes several CPUs 112 configured to operate in parallel with each other and share the load of control, so that various processing can be performed efficiently at a high-speed. The storage controller 110 may have just one CPU 112.

Both the first and second host interface units 114 and 116 function as interfaces between the SAN 190 and the internal bus. In this embodiment, the storage controller 110 includes two host interface units 114 and 116, but it may include any number of host interface units 114 and 116.

The drive interface unit 118 functions as an interface between the internal bus 111 and the disk array device 160. In this embodiment, the storage controller 110 includes one drive interface unit 118, but may include any number of drive interface units 118.

The management console interface unit 119 functions as an interface between the internal bus 111 and a management console 198. The management console 198 is directly connected to the storage apparatus 100 in this embodiment, but it is also possible to use a management LAN (Local Area Network) with one or more storage apparatuses and one or more management consoles connected.

The memory 120 stores programs executed by each CPU 112, information indicating the status of the apparatus, and the like. For example, the memory 120 stores a storage control program 130 that is executed by the CPU 112, and also stores configuration information 140 that indicates the status of the apparatus. Also, the memory 120 includes a cache area 150 for temporarily storing data to be input/output to/from the disk array device 160.

The storage control program 130 includes an I/O processing program 132, a new host detection program 134 and a configuration management program 136.

In the above programs, the I/O processing program 132 is a program for executing basic functions of the storage controller 110. It interprets any command the first or second host interface unit 114 or 116 receives from the first or second host system 192 or 194 (or the third host system 196), and if it is an I/O command, the I/O processing program 132 responds to that command by performing the relevant data transfer between the cache area 150 and a storage medium contained in the disk array device 160, or between the cache area 150 and the first or second host system 192 or 194 (or the third host system 196).

In the above processing, the first or second host system 192 or 194 (or the third host system 196) designates the I/O target address using a combination of an LUN and a logical block address (hereinafter referred to as an LBA). Meanwhile, in order to input/output data to/from the disk array device 160, it is necessary to designate the identifier for a particular storage medium and an LBA defined in that storage medium. So, the I/O processing program 132 performs address conversion processing in accordance with an LU configuration table 142 included in the configuration information 140.

The new host detection program 134 includes a new host registration function for detecting access from any new first or second host system 192 or 194 (or new third host system 196) that has been connected to the SAN 190 and intends to use the storage apparatus 100, and registering that first or second host system 192 or 194 (or third host system 196) so that it can use the storage apparatus 100. The new host registration function is explained in detail later, referring to the flowchart shown in FIG. 7.

The configuration management program 136 functions to manage the configuration information 140. The configuration management program 136 changes the configuration information 140 in response to a request from the new host detection program 134 or the management console 198. The configuration management program 136 also provides the configuration information 140 for the I/O processing program 132, the new host detection program 134 and the management console 198.

The configuration information 140 includes information about the logical units provided for the first and second host systems 192 and 194 (and the third host system 196), information about the mapping between the logical units and the storage media, and other information indicating the status of the storage apparatus 100. The configuration information 140 has an LU configuration table 142, a host-LU mapping table 144 and a security management table 146.

The LU configuration table 142 includes a list of the logical units included in the storage apparatus 100 and information about each logical unit's attributes, such as the capacity of each logical unit. The details are explained later referring to FIG. 3.

The host-LU mapping table 144 includes a list of the logical units available for the first and second host systems 192 and 194 (and the third host system 196) connected to the SAN 190. The details are explained later referring to FIG. 4.

The security management table 146 includes the information required when judging whether the first and second host systems 192 and 194 (and third host system 196) are allowed to be registered as new host systems or not, based on the new host detection program 134. The details are explained later referring to FIG. 5. The cache area 150 is used for improving I/O processing performance.

The disk array device 160 includes a system disk 170 and a disk pool 176. Both the system disk 170 and the disk pool 176 are composed of one or more storage media such as hard disks or flash memory. When composed of several storage media, they may be given a redundant configuration based on a RAID (Redundant Array of Inexpensive Disks) system.

The system disk 170 stores programs and data necessary for the operation of the storage apparatus 100. For example, the system disk 170 stores an archival storage control program 172 and archival configuration information 174, and these are read into the memory 120 upon the startup of the storage apparatus 100. If the configuration information 140 is updated or if the storage apparatus 100 is shut down, the archival configuration information 174 is updated to reflect the content of the configuration information 140 held in the memory 120 at that time.

The disk pool 176 provides each logical unit with an actual storage area, in which data transmitted from the first and second host systems 192 and 194 (and the third host system 196) is stored. Each logical unit is composed of part of the storage area in the disk pool 176.

The first and second host systems 192 and 194 are host computers using the storage apparatus 100, and have been already allocated their respective logical units. Meanwhile, in this embodiment, the third host system 196 is a new host computer that has been added to the SAN 190 and requires the assignment of a new logical unit to use the storage apparatus 100. The first through third host systems 192, 194 and 196 may be connected to the storage apparatus 100 directly, instead of via the SAN 190.

The management console 198 provides a storage administrator with a user interface, such as a GUI (Graphical User Interface) or a CLI (Command Line Interface), required for performing operations relating to changing the configuration information 140, for example, the generation of logical units or settings for security.

Figure 2:
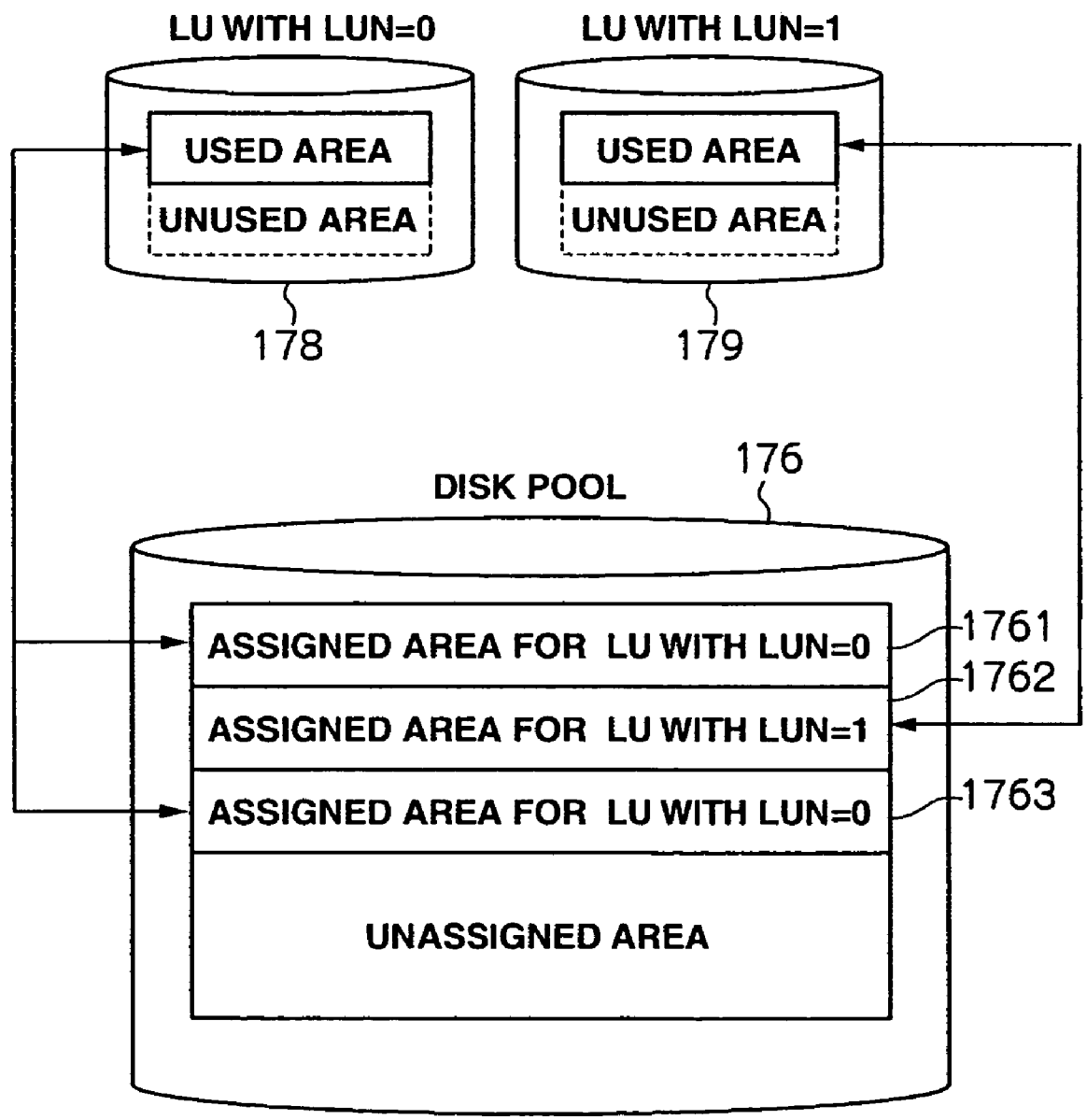
FIG. 2 is a schematic view showing the relationship between a disk pool and logical units.

FIG. 2 briefly shows the relationship between the disk pool 176 and each logical unit. The logical unit means a storage area with predetermined capacity, and when the first or second host system 192 or 194 (or the third host system 196) accesses a logical unit, it designates a specific address included in that logical unit's capacity with the relevant LBA. In this embodiment, a portion of the disk pool 176 is assigned to a logical unit as the actual storage area for storing data stored in that logical unit.

For example, where the first or second host system 192 or 194 (or the third host system 196) issues a write request to any particular logical unit and certain data from that host system is to be stored in that logical unit, if the target LBAs designated in the write request includes an LBA for which an actual storage area has not yet been assigned, a certain actual storage area sufficient for storing the target data is assigned. In this embodiment, the apparent capacity that defines the range of accessible LBAs in a logical unit is referred to as virtual capacity, while the capacity for which an actual storage area has already been assigned is referred to as actual capacity.

FIG. 2 illustrates a logical unit 178 with the LUN "0" and a logical unit 179 with the LUN "1." In the logical unit 178 with the LUN "0," an actual capacity within the range not exceeding its virtual capacity is defined as a used area, and the logical unit 178 is assigned areas 1761 and 1763 in the disk pool 176. Meanwhile, in the logical unit 179 with the LUN "1," an actual capacity within the range not exceeding its virtual capacity is defined as a used area, and the logical unit 179 is assigned area 1762 in the disk pool 176.

Figure 3:
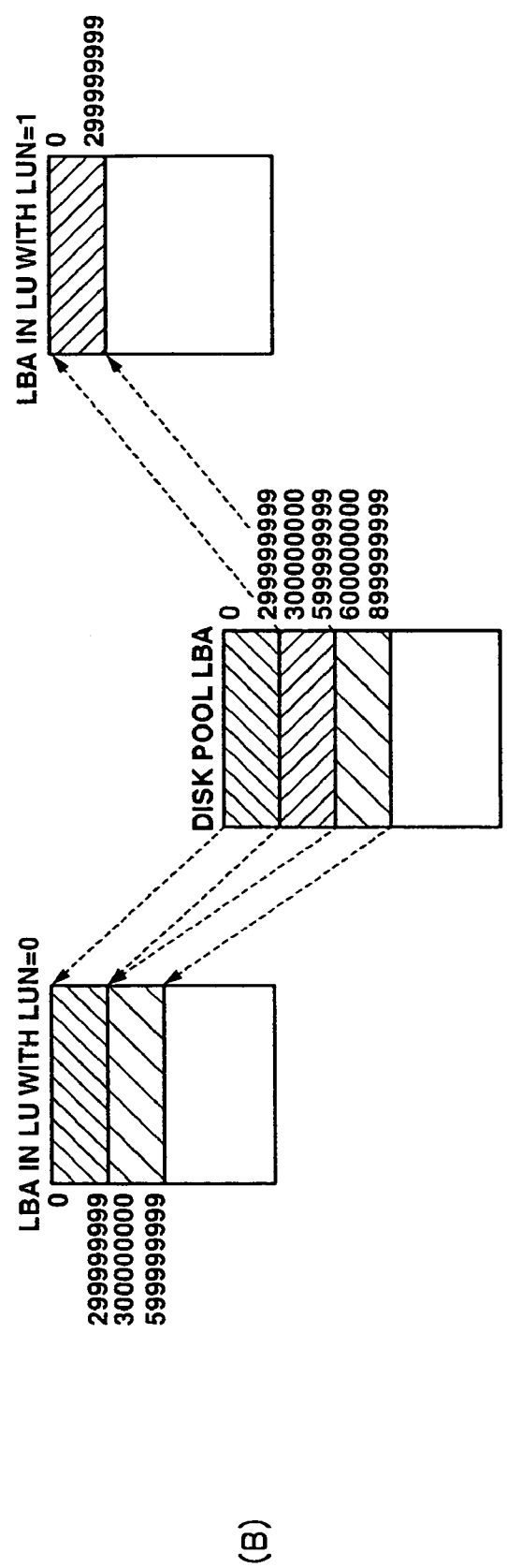
FIG. 3 is a schematic view for explaining an LU configuration table.

FIG. 3 explains the content of the LU configuration table 142. As shown in FIG. 3A, the LU configuration table 142 is composed of an "LUN" field 1421, a "Virtual Capacity" field 1422, an "Actual Capacity" field 1423, a "CPU Number" field 1424 and a "Mapping with Disk Pool" field 1425.

In the above fields, the "LUN" field 1421 stores an identifier unique to each logical unit in the storage apparatus 100. The "Virtual Capacity" field 1422 stores an apparent capacity that defines the range of accessible LBAs in each logical unit, and the "Actual Capacity" field 1423 stores the capacity of the actual storage area within the disk pool 176 already assigned to each logical unit, which is within the range not exceeding the virtual capacity of each logical unit.

Also, if the storage apparatus includes several CPUs 112 and employs a system where the I/O processing program 132 designates one of the CPUs 112 per logical unit as a CPU in charge of performing I/O with respect to a particular logical unit, the "CPU Number" field 1424 stores the identifier for uniquely identifying the CPU 112 in charge of performing the I/O with respect to the relevant logical unit.

Meanwhile, if a logical unit has LBAs already assigned an actual storage area, information regarding the correlation between the LBAs in the logical unit (LU_LBAn) and the LBAs in the disk pool 176 (pool LBAn) is stored in the "Mapping with Disk Pool" field 1425. That correlation may include several pairs of LBAs. FIG. 3B graphically shows the mapping between the LBAs of each logical unit and of the disk pool 176, stored in the "Mapping with Disk Pool" field 1425 in FIG. 3A.

FIG. 4 explains the content of the host-LU mapping table 144. As shown in FIG. 4, the host-LU mapping table 144 is composed of a "WWN" field 1441, a "Host I/F Number" field 1442, a "Host LUN" field 1443 and an "LUN" field 1444.

In the above fields, the "WWN" field 1441 stores an identifier for uniquely identifying a host system connected to the storage apparatus 100 (the identifier is regarded as "WWN" in the below explanation). The "Host I/F Number" field 1442 stores an identifier for specifying the applicable host interface for the host-LUN mapping specified in the relevant entry. The host-LUN mapping specified in one entry does not apply to any access made from a host system via a host interface other than that with the host I/F number stored in the "Host I/F Number" field 1442 of that entry.

The "Host LUN" field 1443 stores the LUN that the corresponding host system designates in its command, and the "LUN" field 1444 stores the identifier for specifying the corresponding logical unit within the storage apparatus 100. That identifier stored in the "LUN" field 1444 corresponds to the LUN stored in the "LUN" field 1421 of the LU configuration table 142.

For example, the first host system 192 has a WWN of "AAA." The host-LU mapping table 144 includes an entry where "AAA" is stored in the "WWN" field 1441. So, according to the information stored with regard to that entry, when the first host system 192 makes access via the first host interface unit 114 with the host LUN being "0," it can access the logical unit with the LUN "0."

FIG. 5 explains the content of the security management table 146. The security management table 146 is a table used for judging whether each host system connected to the storage apparatus 100 is a relevant host system that is allowed to be registered as a new host system. This security management table 146 is composed of a "Priority" field 1460, a "WWN" field 1461 and a "New Host Registration (Allowed/Not Allowed)" field 1462.

In the above fields, the "Priority" field 1460 stores the priority ranking of each entry. The "WWN" field 1461 stores, similarly to the "WWN" field 1441 of the host-LU mapping table 144, the WWN of a host system connected to the storage apparatus 100 as the unique identifier for that host system. In addition to each host system's WWN, a certain reserved word for designating several host systems may also be stored in the "WWN" field 1461. An asterisk (*) shown in FIG. 5 indicates that the entry is targeted in all host systems.

The "New Host Registration (Allowed/Not Allowed)" field 1462 stores information indicating whether the relevant host system(s) are allowed to be registered as a new host system or not. In this embodiment, between each entry in the security management table 146, the content stored in the "New Host Registration (Allowed/Not Allowed)" field 1462 of an entry with high priority takes preference.

For example, in the example shown in FIG. 5, with respect to the first host system 192 having the WWN of "AAA," since the security management table 146 has an entry including "*" in the "WWN" field 1461 (the entry in the first row in FIG. 5), new host registration is allowed for the first host system 192. Meanwhile, with respect to the second host system 194 having the WWN of "BBB," although new host registration is allowed by the entry including "*" in the "WWN" field 1461, there is a higher-priority entry with "BBB" stored in the "WWN" field 1461 (the entry in the second row in FIG. 5), which indicates that new host registration is not allowed, and so the second host system 194 is not allowed to be registered as a new host system.

Figure 6:
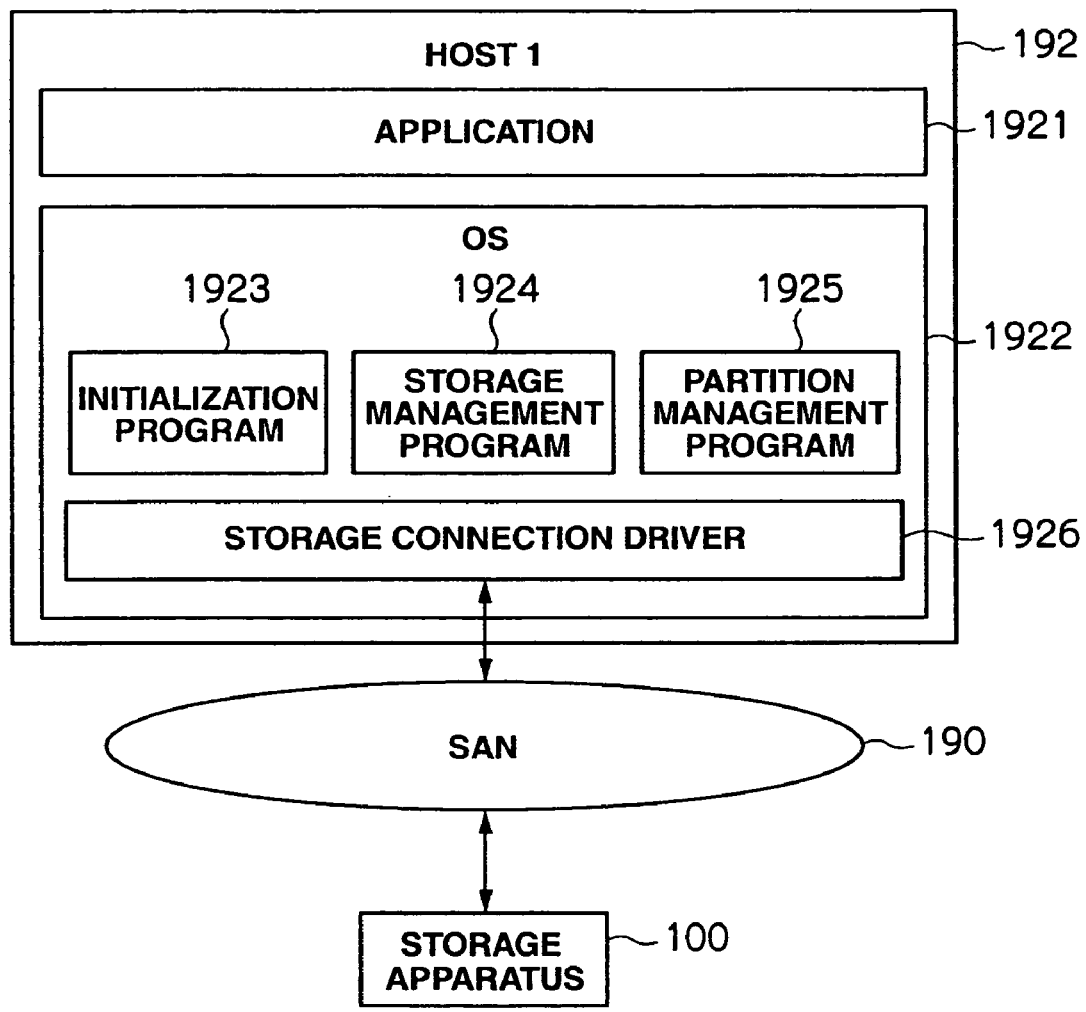
FIG. 6 is a block diagram for explaining a software configuration of first to third host systems.

FIG. 6 explains the configuration of the software that operates on the first host system 192. The second and third host systems 194 and 196 have a similar internal configuration. Examples of software that operates on the first host system 192 include an application 1921 and an OS (Operating System) 1922.

The OS 1922 is composed of software components such as an initialization program 1923, a storage management program 1924, a partition management program 1925, and a storage connection driver 1926.

In the above, the initialization program 1923 carries out hardware setting or other settings at the boot-up of the OS 1922. Processing executed by the initialization program 1923 includes searching for storage apparatuses available for the first host system 192. For that search, the initialization program 1923 calls a subroutine in the storage connection driver 1926.

The storage management program 1924 performs a re-search for storage apparatuses available for the first host system 192, in response to a command from a host system administrator. For that search, the storage management program 1924 calls a subroutine in the storage connection driver 1926.

The storage connection driver 1926 searches for a storage apparatus available for the first host system 192 in response to a request from the initialization program 1923 or the storage management program 1924. It searches for a logical unit available for the first host system 192, by searching for storage apparatuses existing on the SAN 190, and when it finds one, sending that storage apparatus a command to inquire about whether the storage apparatus has a logical unit configuration available for the first host system 192 (hereinafter referred to as a "logical unit configuration inquiry command").

The partition management program 1925 formats a logical unit that the storage connection driver 1926 has found, based on a file system or other data structures so that the application 1921 can use the logical unit.

Next, how the new host registration function is implemented in the storage apparatus 100 is explained. The new host registration function is a function where the storage apparatus 100 detects a connection made from a host system having no logical unit in that storage apparatus (the third host system 196 in FIG. 1, for instance), generates a logical unit to be assigned to that host system, and creates the mapping of the generated logical unit with that host system. Receiving a logical unit configuration inquiry command issued by a host system upon its connection to a network (SAN190) or the storage apparatus 100 serves as a trigger for the above-mentioned detection of a host system's connection.

The logical unit configuration inquiry command is sent while the storage connection driver 1926 of a host system is searching for available storage apparatuses, and the format of the command differs according to SAN protocol types or host system installed OS types.

For example, if Fibre Channel or SAS (Serial Attached SCSI) is used, a host system can use a "REPORT_LUNS" command to acquire a logical unit list from the storage apparatus, or can use an "INQUIRY" command to ask about whether a specified logical unit exists and issue that command sequentially to the valid range of LUNs, depending on that host system's installed OS. When using the "REPORT_LUNS" command, receiving that type of logical unit configuration inquiry command serves as a trigger for the detection of a host system's connection, and when using the "INQUIRY" command, receiving that type of logical unit configuration inquiry command for the first time serves as a similar trigger.

Figure 7:
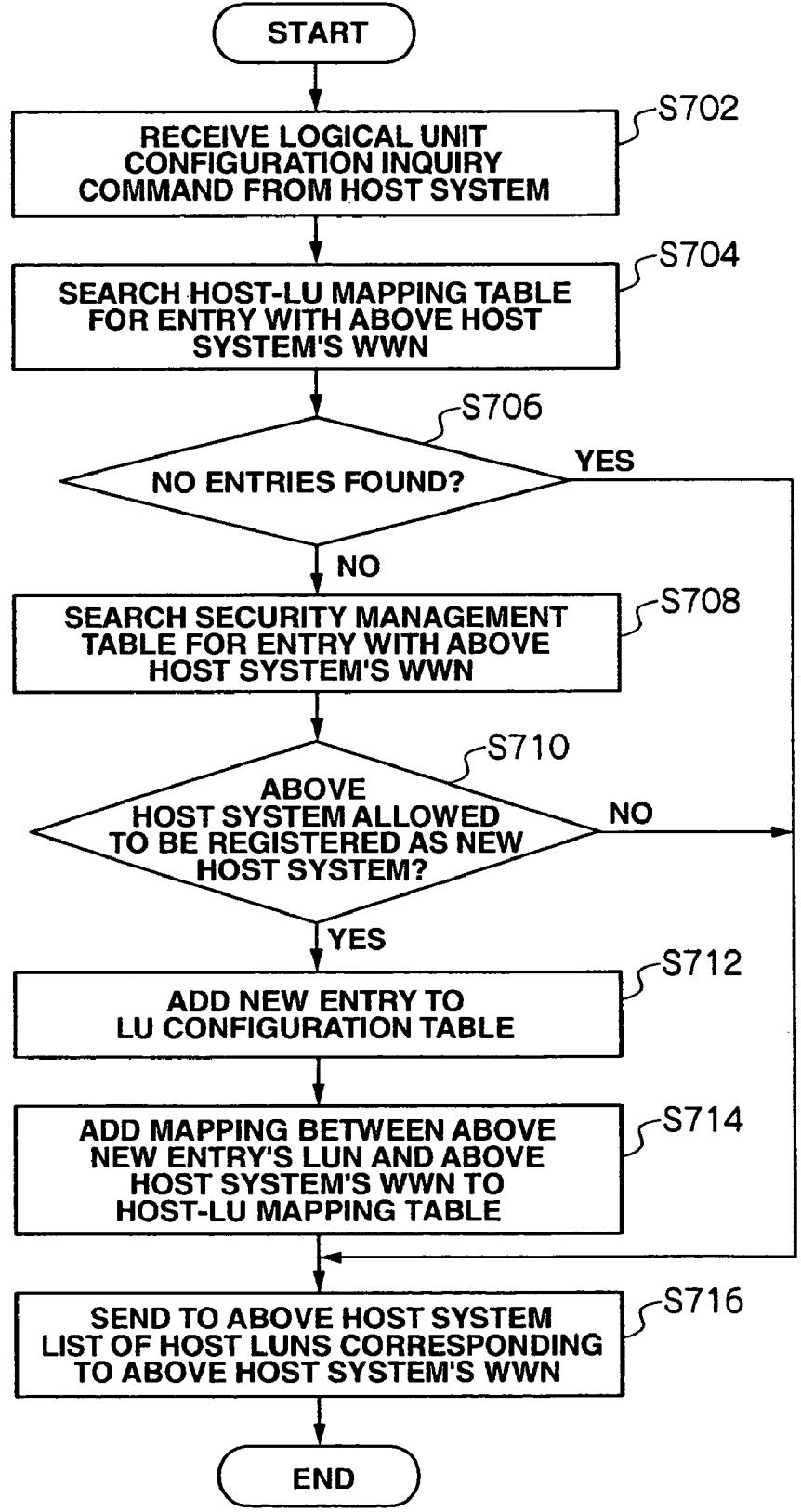
FIG. 7 is a flowchart showing responding steps.

FIG. 7 is a flowchart explaining how the storage apparatus 100 responds to a logical unit configuration inquiry command, in relation to the new host registration function. In accordance with the new host detection program 134 stored in the memory 120, the CPU 112 in the storage apparatus 100 follows the responding steps shown in FIG. 7 to respond to a logical unit configuration inquiry command from a host system.

Specifically, when the CPU 112 is informed by the I/O processing program 132 of the receipt of a logical unit configuration inquiry command from a host system (S702), it acquires the WWN of the host system sending the logical unit configuration inquiry command (hereinafter referred to as a source host system), and searches the host-LU mapping table 144 for an entry including the above WWN (S704).

The CPU 112 sees the result of the search at step S704 and judges whether there is a relevant entry (S706). If there are any relevant entries (S706: YES), the CPU 112 judges the source host system as not being a new host system, and goes to step S716.

Meanwhile, if the CPU 112 finds no relevant entries in the above search (S706: NO), it judges the source host system as being a new host system, and then searches the security management table 146 for any entry including the above WWN or "*" (S708).

The CPU 112 sees the result of the above search and judges whether the source host system is allowed to be registered as a new host system or not (S710). If the registration is not allowed (S710: NO), the CPU 112 goes to S716, and if the registration is allowed (S710: YES), the CPU 112 generates a new logical unit associated with the source host system (hereinafter simply referred to as a new logical unit) and registers it in the LU configuration table 142 (S712). In this way, so long as the source host system is new and is allowed to be registered as a new host system, the CPU 112 performs the above generation of a new logical unit and registers it in the LU configuration table 142.

In the above generation and registration, the CPU 112 chooses a new logical unit LUN not overlapping the other logical unit LUNs, and stores the chosen LUN in the "LUN" field 1421 of the LU configuration table 142. Also, with respect to the virtual capacity of that new logical unit, the CPU 112 stores a predetermined virtual capacity value in the "Virtual Capacity" field 1422 of the LU configuration table 142. This predetermined value may be the maximum value specified by the SAN 190 protocol. Alternatively, the predetermined value may be a value that is able to be set at the management console 198.

Furthermore, with respect to the actual capacity of the new logical unit, the CPU 112 stores "0" in the "Actual Capacity" field 1423 of the LU configuration table 142 at that time, without assigning an actual storage area. Note that it is also possible to assign a predetermined amount of actual storage area at that time. In that case, the status of the above assignment of the actual storage area should be reflected in the "Mapping with Disk Pool" field 1425 of the LU configuration table 142.

Furthermore, the CPU 112 selects a specific CPU 112 for handling data I/O processing or other processing with respect to the new logical unit, and stores its identification number in the "CPU Number" field 1424 of the LU configuration table 142. If a plurality of CPUs 112 exist, the above selection of a CPU 112 is performed so that all CPUs 112 can share I/O processing as evenly as possible. For example, the CPU 112 is configured to choose the CPU 112 handling the smallest capacity of logical units in total, or the CPU 112 handling the smallest number of logical units.

Subsequently, the CPU 112 enters the mapping between the source host system and the new logical unit that has been registered in the LU configuration table 142 at step S712 into the host-LU mapping table 144. In this new entry, the WWN of the source host system is stored in the "WWN" field 1441 (S714). Also, the host I/F number of the host interface unit 114 or 116 that receives the logical unit configuration inquiry command is stored in the "Host I/F Number" field 1442. Moreover, a predetermined value is stored in the "Host LUN" field 1443. The predetermined value is "0," for example. Further still, the LUN of the logical unit that has been generated at step S712 is stored in the "LUN" field 1444.

Then, the CPU 112 obtains from the host-LU mapping table 144 the list of the host LUNs that correspond to the source host system's WWN, and sends the list to the source host system as a response to the logical unit configuration inquiry command (S716). If a new logical unit has been added to the LU configuration table 142 at steps S712 and S714, that new logical unit is also included in the above list of the host LUNs. Note that if the "INQUIRY" command is used as the logical unit configuration inquiry command, the CPU 112 sends a report about the existence of each LUN. In the above way, the processing responding to the logical unit configuration inquiry command is completed.

As a more specific example of the new host registration processing, the series of steps taken when the third host system 196 is added to the SAN 190 as a new host system is explained next.

When the third host system 196 is connected to the SAN 190, and the OS 1922 of that third host system 196 is booted up, the OS 1922 sends the storage apparatus 100 a logical unit configuration inquiry command.

Receiving the above logical unit configuration inquiry command, the CPU 112 in the storage apparatus 100 judges whether the third host system 196 is allowed to be assigned a new logical unit, based on the host-LU mapping table 144 and the security management table 146 (S704 through S710).

Since there is no entry in the host-LU mapping table 144 that has a WWN of "CCC," which is the WWN of the third host system 196, in the "WWN" field 1441, the CPU 112 judges the third host system 196 as being a new host system (S706). Furthermore, in accordance with the entry in the security management table 146 that has "*" in the "WWN" field 1461, the CPU 112 judges the third host system 196 as being a host system that is allowed to be registered as a new host system (S710). Based on the above judgments, the CPU 112 determines that it is necessary to assign a new logical unit to the third host system 196.

Then, the CPU 112 makes a new entry in the LU configuration table 142 with regard to a new logical unit associated with the third host system 196, as shown in FIG. 8 (S712). In the example shown in FIG. 8, the new logical unit is given an LUN of "2" and a virtual capacity of "2000 GB." Also in this example, since the new logical unit has not yet been used, an actual capacity of "0 GB" is set for the logical unit, and in order to balance the load, the new logical unit is assigned a CPU 112 with a CPU number of "3," which is not assigned to other logical units.

Also, as shown in the next drawing FIG. 9, the CPU 112 adds an entry to the host-LU mapping table 144 with regard to the mapping between the new logical unit and the third host system 196 (S714). In the example shown in FIG. 9, the third host system 196 is associated with the first host interface unit 114. Also, the new logical unit is given "0", as the host LUN and "2" as its LUN in the storage apparatus 100.

As explained above, according to the storage system 1 in this embodiment, it is possible to achieve the function of assigning a logical unit to a new host system upon its first connection to the storage apparatus 100 and immediately enabling that host system's use of the relevant storage area.

At that time, an administrator of the storage apparatus 100 does not need to determine the capacity of the logical unit to be assigned to the third host system, or give the storage apparatus 100 a command to generate a logical unit or similar. The storage apparatus 100 is made available for the host system only by the host system administrator connecting the host system to the storage apparatus 100, and then either starting it or directing the OS 1922 (in FIG. 6) to re-search for the storage apparatus 100. Thus, it is possible to simplify the setting steps for the storage apparatus required whenever a storage apparatus is introduced or a new host system is added.

Furthermore, if the storage apparatus 100 includes a plurality of CPUs 112, as in this embodiment, the assignment of logical units to each CPU 112 is performed so that the load to each CPU 112 is well balanced, and thus, it is possible to reduce the possibility of a particular CPU 112 becoming a bottleneck, degrading the storage system performance. Moreover, it is possible to prevent a particular host system from being assigned a logical unit in the storage apparatus 100, thereby ensuring security in the storage system.

(2) Second Embodiment

FIG. 10, in which the same reference numerals are used for the components corresponding to those in FIG. 1, shows a storage system 200 according to the second embodiment. The storage system 200 includes a name server 300 connected to the SAN 190. The name server 300 uses a node management table 310 to manage the correlation between a storage apparatus 210 and first and second host systems 250 and 252 (and third host system 254) in terms of their node names and addresses, and in this respect, the storage system 200 differs significantly from the storage system 1 according to the first embodiment (first difference).

Generally, a name server is required in the technologies used in highly-generalized and relatively large-scale networks, like IP network technology. One example is a SAN 190 where IP is used for the network layer and iSCSI (Internet Small Computer System Interface) is used for the protocol between a host system and a storage system.

Here, the "node" is a generic concept including an initiator that is a command source and a target that is a command destination, and the "node name" means a node identifier. The first and second host systems 250 and 252 (and the third host system 254), and the storage apparatus 210 may logically have a plurality of nodes. The name server 300 functions to enable the first and second host systems 250 and 252 (and the third host system 254) on the network and the storage apparatus 210 to reference the node management table 310, and it also functions to change the node management table 310.

The storage system 200 according to the second embodiment also differs from the storage system 1 according to the first embodiment (second difference) in the configuration information 240 components, which is related to the first difference. In the storage system 200 according to this embodiment, the configuration information 240 includes an LU configuration table 142, a target configuration table 242 and a security management table 244.

In the above, the target configuration table 242 is configured to include the information about the targets held by the storage apparatus 210 and about the logical unit of each target. Furthermore, like the security management table 146 in the first embodiment (FIG. 5), the security management table 244 is a table generated to store the information about whether the first and second host systems 250 and 252 (and the third host system 254) are allowed to be registered as new host systems, and it is configured the same way the security management table 146 is, except that a node name, not a WWN, is used as the identifier for the first and second host systems 250 and 252 (and the third host system 254).

FIG. 11 shows the configuration of the node management table 310. As shown in FIG. 11, the node management table 310 is composed of a "Node Name" field 311, a "Node Type" field 312, a "Node Addition Report (Required/Not Required)" field 313, a "Domain" field 314 and an "Address" field 315.

In the above, the "Node Name" field 311 stores the relevant node name registered in the name server 300. The "Node Type" field 312 stores information about whether the relevant node is an initiator or a target. The "Node Addition Report (Required/Not Required)" field 313 stores information about whether the node with a node name stored in the corresponding "Node Name" field 311 should be informed of reports indicating any addition of a new node to the same domain (hereinafter referred to as "node addition reports"). Here, those reports are sent if a new node is added to the same domain, and not sent if a new node is added to other domains.

The "Domain" field 314 stores the definition of the group that contains the relevant node. If nodes are included in the same group (domain), the same domain is stored in their "Domain" fields 314. Nodes having the same domain can ask the name server 300 to search for each other. The "Address" field 315 stores the relevant node identifier recognized on the network. In the case of an IP network, for example, an IP address is used as that node identifier.

FIG. 12 shows the configuration of the target configuration table 242. As shown in FIG. 12, the target configuration table 242 is composed of a "Target Name" field 2421, a "Host I/F Number" field 2422, a "Host Node Name" field 2423, a "Host LUN" field 2424 and a "LUN" field 2425.

In the above, the "Target Name" field 2421 stores the node name of the relevant target held by the storage apparatus 210, and the "Host I/F Number" field 2422 stores the identifier for the host interface unit 114 or 116 capable of accessing the target with a target name stored in the corresponding "Target Name" field 2421.

The "Host Node Name" field 2423 stores the node name of an initiator (the first or second host system 250 or 252 (or the third host system 254)) using the target with a target name stored in the corresponding "Target Name" field 2421, and the "Host LUN" field 2424 stores the LUN recognized by the first or second host system 250 or 252 (or the third host system 254) with respect to the corresponding logical unit. The "LUN" field 2425 stores the identifier for specifying that logical unit within the storage apparatus 210. The identifier corresponds to the LUN stored in the "LUN" field 1421 of the LU configuration table 142.

How a new host registration function is implemented in this embodiment is explained next. In this embodiment, receiving a report from the name server 300 about a new node having been added to the name server 300 (hereinafter referred to as a "node addition report") serves as a trigger for the storage apparatus 210 detecting a new host system.

When a host system wishes to use the storage apparatus 210, it has its node name together with a new domain registered in the name server 300. In accordance with the node management table 310, the name server 300 reports about that addition of a new node to the storage apparatus 210, which is established as a default target, by sending a node addition report. In FIG. 11, if "*" is stored in the "Domain" field 314 of the node management table 310, it shows the relevant node can be included in any domain.

Figure 13:
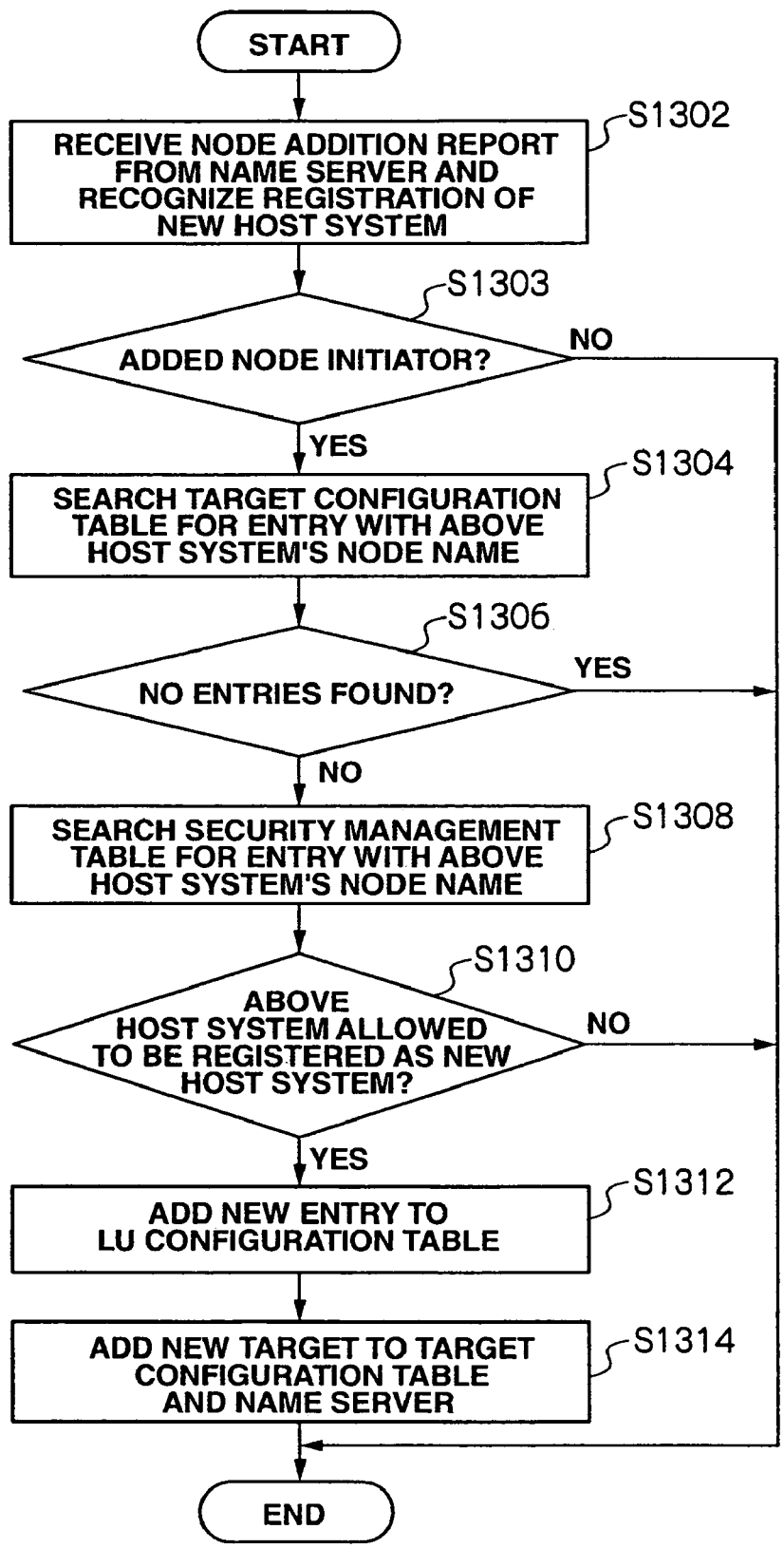
FIG. 13 is a flowchart for the steps for new host registration.

FIG. 13 is a flowchart illustrating how the storage apparatus 210, having been informed by the name server 300, registers a new host system. In accordance with a new host detection program 232, which is a program included in the storage control program 230 stored in the memory 120, the CPU 112 in the storage apparatus 210 follows the new host registration steps shown in FIG. 13 to register a new host system that has been connected to the SAN 190.

Specifically, when the CPU 112 is informed by the I/O processing program 132 of having received a node addition report from the name server 300 (S1302), the CPU 112 judges whether the added node is an initiator or not (S1303). If the node is not an initiator (S1303: NO), the CPU 112 ends the new host registration processing.

Meanwhile, if the added node is an initiator (S1303: YES), the CPU 112 searches the target configuration table 242 for an entry including the node name of the added node (S1304), and judges whether any such entry exists or not (S1306).

If the CPU 112 can detect any such entry (S1306: YES), it ends the new host registration processing, and if it can detect no such entry (S1306: NO), it searches the security management table 244 for an entry including the above node name or "*" (S1308).

Based on the above search result, the CPU 112 then judges whether the above node is allowed to be registered as a new host system or not (S1310), and if it is not allowed (S1310: NO), the CPU 112 ends the new host registration processing.

Meanwhile, if the node is allowed to be registered as a new host system (S1310: YES), the CPU 112 generates a new logical unit and makes a corresponding entry in the LU configuration table 142, as in step S712 of the flowchart shown in FIG. 7 for the first embodiment (S1312).

The CPU 112 then registers the above new target in the target configuration table 242 (S1314). Specifically, the CPU 112 chooses the new target a target name not overlapping the other entries', and stores the chosen target name in the "Target Name" field 2421 of the target configuration table 242. The CPU 112 also associates that target with the first or second host interface unit 114 or 116 that has received the above node addition report from the name server 300, and stores the identifier for that host interface unit in the "Host I/F Number" field 2422 of the target configuration table 242.

Furthermore, the CPU 112 stores the above host system's node name in the "Host Node Name" field 2423 of the target configuration table 242, and also stores a predetermined value in the "Host LUN" field 2424 of the target configuration table 242. The CPU 112 further stores the LUN of the logical unit that has been generated at step S1312 in the "LUN" field 2425 of the target configuration table 242.

After that, the CPU 112 requires the name server 300 to add a new node that is the above new target. At that time, the CPU 112 provides the name server 300 with information about the node name of the new target, the address of the corresponding host interface, the domain (the same as that of the above host system) and the necessity (or no) for a node addition report. Accordingly, the CPU 112 completes the steps to be performed in response to the receipt of a node addition report.

As a more specific example of the new host registration processing, explained next is a series of steps where the third host system 254 is added to the SAN 190 as a new host system.

When the third host system 254 is connected with the SAN 190 and registered in the name server 300 with the node name of "Initiator3" and the domain name of "DD3," the CPU 112 in the storage apparatus 210 judges whether it is necessary to assign a new logical unit to that third host system 254 (S1304 through S1310).

At that time, since the target configuration table 242 has no entry having "Initiator3," which is the name of the third host system 254, in the "Host Node Name" field 2423, the CPU 112 judges that the third host system 254 is a new host system (S1306). Also, the CPU 112 judges that the third host system 254 is allowed to be registered as a new host system, based on the entry having "*" in the "WWN" field 1461 of the security management table 244 (S1310). Then, based on the above judgment, the CPU 112 determines that a new logical unit needs to be assigned to the third host system 254.

So, as shown in FIG. 8, the CPU 112 makes a new entry in the LU configuration table 142 for a new logical unit associated with the third host system 254 (S1312).

Also, as shown in FIG. 14, the CPU 112 then adds an entry to the target configuration table 242 for the mapping between the new logical unit and the third host system 254 (S1314). In the example in FIG. 14, the third host system 254 (having the node name "Initiator3") is registered with the target name of "Target3," and is also associated with the first host interface unit 114. Furthermore, the new logical unit is given "0" as the host LUN and "2" as its LUN recognized within the storage apparatus 210.

FIG. 15 shows the node management table 310 containing the additional entry for a new node that is the third host system 254. Comparing it with the node management table before the above additional entry is made for the new node (see FIG. 11), one can see the additional entries of an initiator with the name of "Initiator3" and a target with the name of "Target3," both having the domain "DD3."

After making the additional entries of the above initiator "Initiator3" and target "Target3," the name server 300 informs the third host system 254 that the target "Target3" has been added in the domain "DD3." Then, the third host system 254, having been so informed, is in a state where it is able to use the logical unit included in the target "Target3."

As explained above, according to the storage system 200 in this embodiment, even in the SAN environment managed by the name server 300, it is possible to achieve the function of assigning a logical unit to a new host system upon its first connection to the storage apparatus 210 and immediately enabling the host system to use the assigned logical unit, as in the first embodiment.

At that time, an administrator of the storage apparatus 210 does not need to determine the capacity of a logical unit to be assigned to a new host system, or give the storage apparatus 210 a command to generate a logical unit or similar. The storage apparatus 210 is made available for the host system only by the host system administrator connecting the host system to the storage apparatus 210, and then making a registration into the name server 300. Thus, it is possible to simplify the setting steps for the storage apparatus required whenever a storage apparatus is introduced or a new host system is added.

Furthermore, if the storage apparatus 210 includes a plurality of CPUs 112, as in this embodiment, the assignment of logical units to each CPU 112 is performed so that the load to each CPU 112 is well balanced, and thus, it is possible to reduce the possibility of a particular CPU 112 becoming a bottleneck, degrading the storage system performance. Moreover, it is possible to prevent a particular host system from being assigned a logical unit in the storage apparatus 210, thereby ensuring security in the storage system.

(3) Other embodiments

In the above-described first and second embodiments, the present invention is applied to the storage apparatuses 100 and 210 configured as in FIGS. 1 and 10 respectively, but the invention is not limited to those embodiments. For example, the invention can be widely applied to the storage apparatus 400 configured as shown in FIG. 16, or storage apparatuses with other configurations.

Figure 16:
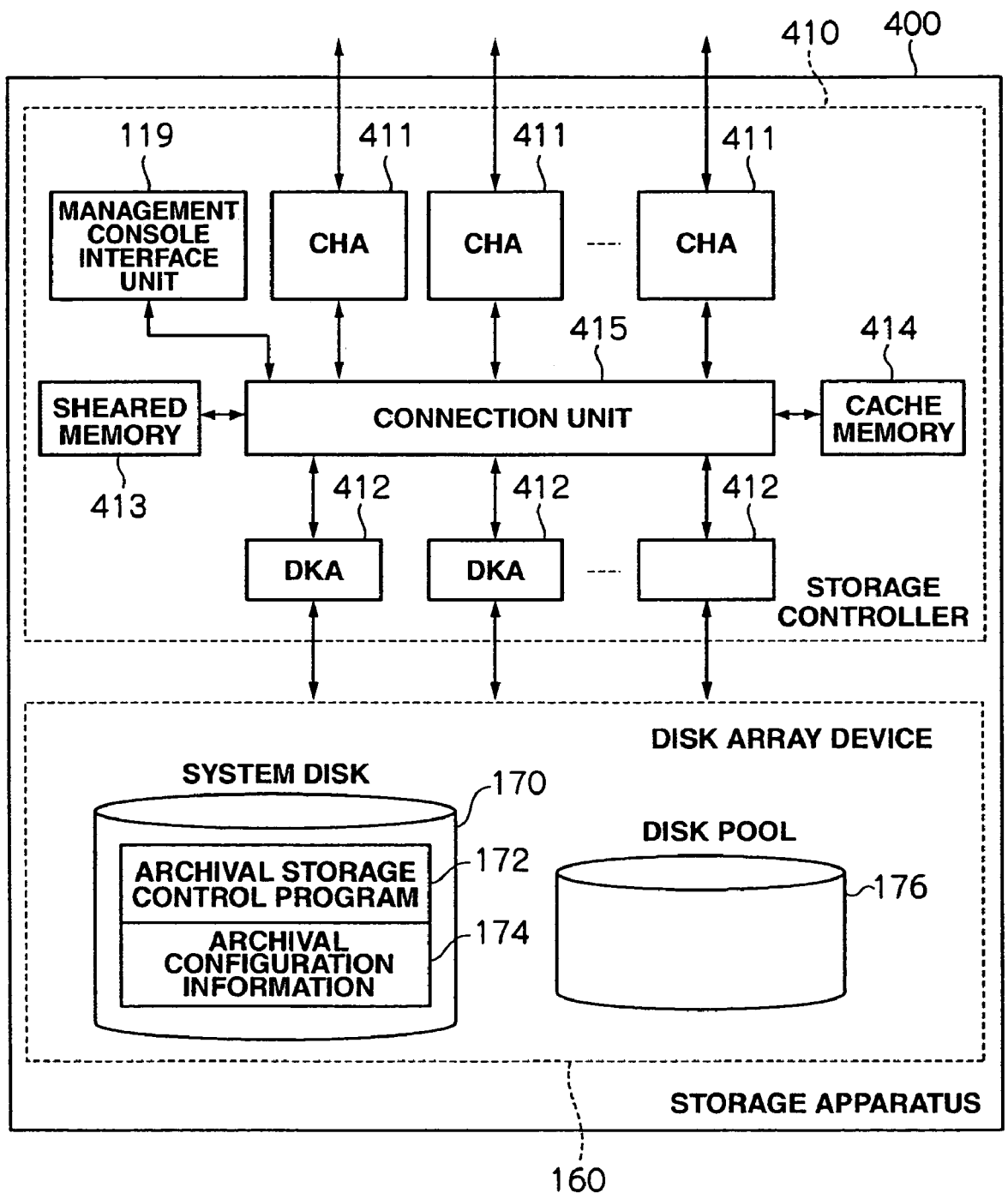
FIG. 16 is a block diagram for a storage apparatus configuration according to another embodiment.

The storage apparatus 400 shown in FIG. 16 has a configuration where a storage controller 410 has a plurality of channel adapters 411 functioning as interfaces with a host system; a plurality of disk adapters 412 functioning as interfaces with a disk array device 160; a shared memory 413 storing various system information like the configuration information 140 and 240 in the first and the second embodiments; and a cache memory 141 temporarily storing data to be input to or output from the disk array device 160, all being mutually connected via a connection unit 415 comprising a crossbar switch or similar. In the storage apparatus 400, each channel adapter 411 has a CPU (not shown in the drawing), and a memory with a program corresponding to the storage control programs 130 and 230 in the first and second embodiments stored therein (not shown in the drawing), and is configured to be able to carry out the new host registration processing as explained in the first and second embodiments referring to FIGS. 7 and 13 respectively.

Furthermore, in the first and second embodiments above, a host detection unit that detects a connection from a new host system having no logical unit assigned thereto, and a logical unit assigning unit that assigns a new logical unit to a new host system when the host detection unit detects the new host system or a data write request is sent from the new host system are configured by the CPU(s) 112 that control the entire operation of the storage apparatuses 100 and 210, and the new host detection programs 134 and 232. However, the present invention is not limited to this, and the above-described host detection unit and logical unit assigning unit may be configured by a specially designated CPU included in addition to the above CPU(s) 112.

This invention can be widely applied to various types of storage apparatuses.

What is claimed is:

1. A storage apparatus for performing data input/output in response to data input/output requests from a host system, with respect to a logical unit assigned to the host system, comprising:

a storage controller;

a plurality of media to provide actual storage capacity to at least one logical unit, wherein the storage controller comprises:

a host detection unit that detects a connection from a new host system;

a logical unit assigning unit that assigns, if the new host system is detected by the host detection unit, a new logical unit to the new host system; and a mapping table comprising information relating a host system coupled to the storage controller to a logical unit assigned to the host system, wherein, when the storage controller receives an inquiry command from the new host system, the host detection unit determines whether at least one logical unit is assigned to the new host system, identified in the inquiry command, based on information in the mapping table, wherein, when a relation between the new host system and any one logical unit is not stored in the mapping table, the logical unit assigning unit assigns the new logical unit to the new host system, and a relation between the new host system and the new logical unit is store in the mapping table;

wherein for the new logical unit assigned to the new host system, a virtual capacity and an actual capacity are determined, wherein the virtual capacity is a range of an address space accessible by the new host system, wherein the actual capacity is an amount of actual storage area provided by the plurality of media comprising the new logical unit, wherein the actual storage area is assigned to the new logical unit when a data write request is received from the new host system;

wherein the logical unit assigning unit associates the new host system with the new logical unit assigned thereto so that the new logical unit accepts the data input/output requests only from that new host system;

wherein the logical unit assigning unit holds security management information specifying whether the new host system detected by the host detection unit is allowed to be registered or not allowed to be registered, judges, based on the security management information, whether the new host system detected by the host detection unit is allowed to be registered or not, and if allowed, assigns the new logical unit to that new host system.

2. The storage apparatus according to claim 1, wherein the logical unit assigning unit assigns to the new logical unit a predetermined amount of actual storage area, if the new host system is detected by the host detection unit or if a data write request is received from the new host system.

3. The storage apparatus according to claim 1, wherein the storage controller further comprises a plurality of processors, each controlling the data input, wherein the logical unit assigning unit selects one processor from the plurality of processors as a processor for controlling the data input/output with respect to the new logical unit assigned to the new host system, so that the processors share any load evenly between each other.

4. The storage apparatus according to claim 1, wherein the security management information includes a code for specifying whether any new host system is allowed to be registered or not allowed to be registered.

5. The storage apparatus according to claim 1, wherein the plurality of media include flash memory.

6. A method for controlling a storage apparatus that performs data input/output in response to data input/output requests from a host system, with respect to a logical unit assigned to the host system, the method comprising the steps of:

detecting a connection from a new host system;

assigning a new logical unit to the new host system when the new host system is detected, the assigning step includes assigning to the new logical unit a predetermined amount of actual storage area to the new host system, if the new host system is detected or if a data write request is received from the new host system;

allocating the actual storage area when a data write request is received from the new host system, wherein, when an inquiry command is received from the new host system, then determining whether at least one logical unit is assigned to the new host system, based on information in a mapping table comprising information relating a host system coupled to the storage apparatus to a logical unit assigned to the host system, wherein, when a relation between the new host system and any one logical unit is not stored in the mapping table, then assigning a new logical unit to the new host system, and storing information in the mapping table indicative of the a relation between the new host system and the new logical unit;

wherein for the new logical unit assigned to the new host system, determining a virtual capacity and an actual capacity therefore, wherein the virtual capacity is a range of an address space accessible by the new host system, wherein the actual capacity is an amount of actual storage area provided by the plurality of media comprising the new logical unit;

wherein the storage apparatus holds security management information specifying whether the new host system is allowed to be registered or not allowed to be registered, and wherein the assigning step includes judging, based on that security management information, whether the new host system is allowed to be registered or not, and if allowed, assigning the new logical unit to that new host system.

7. The storage apparatus control method according to claim 6, wherein the assigning step includes associating the new host system with the new logical unit assigned thereto so that the new logical unit accepts the data input/output requests only from that new host system.

8. The storage apparatus control method according to claim 6, wherein the storage apparatus comprises a plurality of processors, each controlling the data input, and wherein the assigning step includes selecting one processor from the plurality of processors as a processor for controlling the data input/output with respect to the new logical unit assigned to the new host system, so that the processors share any load evenly between each other.

9. The storage apparatus control method according to claim 6, wherein the security management information includes a code for specifying whether any new host system is allowed to be registered or not allowed to be registered.

10. The storage apparatus control method according to claim 6, wherein the plurality of media include flash memory.

* * * * *